United States Patent
Gallagher et al.

(10) Patent No.: US 9,567,858 B2
(45) Date of Patent: Feb. 14, 2017

(54) GAS TURBINE ENGINE AIRFOIL

(71) Applicant: United Technologies Corporation, Hartford, CT (US)

(72) Inventors: Edward J. Gallagher, West Hartford, CT (US); Lisa I. Brilliant, Middletown, CT (US); Joseph C. Straccia, Middletown, CT (US); Stanley J. Balamucki, The Villages, FL (US); Mark A. Stephens, Wethersfield, CT (US); Kate Hudon, Superior, CO (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/626,130

(22) Filed: Feb. 19, 2015

(65) Prior Publication Data

US 2016/0069187 A1    Mar. 10, 2016

Related U.S. Application Data

(60) Provisional application No. 61/941,671, filed on Feb. 19, 2014.

(51) Int. Cl.
F01D 5/14 (2006.01)

(52) U.S. Cl.
CPC ..................................... F01D 5/141 (2013.01)

(58) Field of Classification Search
CPC .................................. F01D 5/14; F01D 5/141
USPC ........................................ 415/69; 416/223 R
See application file for complete search history.

(56) References Cited

U.S. PATENT DOCUMENTS

| | | | |
|---|---|---|---|
| 2,934,259 A | 4/1960 | Hausmann | |
| 3,287,906 A | 11/1966 | McCormick | |
| 3,747,343 A | 7/1973 | Rosen | |
| 4,012,172 A | 3/1977 | Schwaar et al. | |
| 4,431,376 A | 2/1984 | Lubenstein et al. | |
| 4,682,935 A | 7/1987 | Martin | |
| 4,826,400 A | 5/1989 | Gregory | |
| 4,900,230 A | 2/1990 | Patel | |
| 4,919,593 A * | 4/1990 | Brown | 416/223 A |
| 5,088,892 A | 2/1992 | Weingold | |
| 5,141,400 A | 8/1992 | Murphy et al. | |

(Continued)

FOREIGN PATENT DOCUMENTS

| | | |
|---|---|---|
| EP | 0801230 | 5/2009 |
| EP | 2226468 | 9/2010 |

(Continued)

OTHER PUBLICATIONS

Aerodynamic Design Technique for Optimizing Fan Blade Spacing, Rogalsky et al., Proceedings of the 7th Annual Conference of the Computational Fluid Dynamics Society of Canada, 1999.*

(Continued)

*Primary Examiner* — Woody Lee, Jr.
(74) *Attorney, Agent, or Firm* — Carlson, Gaskey & Olds, P.C.

(57) ABSTRACT

An airfoil of a turbine engine according to an example of the present disclosure includes, among other things, pressure and suction sides extending in a radial direction from a 0% span position to a 100% span position. The airfoil has a relationship between a gap/chord ratio and span position that defines a curve with a gap/chord ratio having a portion with a negative slope.

23 Claims, 8 Drawing Sheets

(56) References Cited

U.S. PATENT DOCUMENTS

| | | |
|---|---|---|
| 5,167,489 A | 12/1992 | Wadia et al. |
| 5,277,549 A | 1/1994 | Chen et al. |
| 5,443,367 A | 8/1995 | Samit et al. |
| 5,525,038 A | 6/1996 | Sharma et al. |
| 5,624,234 A | 4/1997 | Neely et al. |
| 5,642,985 A | 7/1997 | Spear et al. |
| 5,725,354 A | 3/1998 | Wadia et al. |
| 5,915,917 A | 6/1999 | Eveker et al. |
| 6,059,532 A | 5/2000 | Chen et al. |
| 6,079,948 A | 6/2000 | Sasaki et al. |
| 6,299,412 B1 | 10/2001 | Wood et al. |
| 6,312,219 B1 | 11/2001 | Wood et al. |
| 6,328,533 B1 | 12/2001 | Decker et al. |
| 6,331,100 B1 | 12/2001 | Lui |
| 6,341,942 B1 | 1/2002 | Chou et al. |
| 6,899,526 B2 | 5/2005 | Doloresco et al. |
| 6,994,524 B2 | 2/2006 | Owen et al. |
| 7,204,676 B2 | 4/2007 | Dutton et al. |
| 7,374,403 B2 | 5/2008 | Decker et al. |
| 7,396,205 B2 | 7/2008 | Dube et al. |
| 7,476,086 B2 | 1/2009 | Wadia et al. |
| 7,497,664 B2 | 3/2009 | Walter et al. |
| 7,547,186 B2 | 6/2009 | Schuster et al. |
| 7,785,075 B2 | 8/2010 | Botrel et al. |
| 7,806,653 B2 | 10/2010 | Burton et al. |
| 7,967,571 B2 | 6/2011 | Wood et al. |
| 7,997,872 B2 | 8/2011 | Wilson |
| 7,997,882 B2 | 8/2011 | Shulver |
| 8,087,885 B2 | 1/2012 | Suciu |
| 8,147,207 B2 | 4/2012 | Orosa et al. |
| 8,167,567 B2 | 5/2012 | Kirchner et al. |
| 8,246,292 B1 | 8/2012 | Morin et al. |
| RE43,710 E | 10/2012 | Spear et al. |
| 8,393,870 B2 | 3/2013 | Nash et al. |
| 8,464,426 B2 | 6/2013 | Kirchner et al. |
| 2002/0021968 A1* | 2/2002 | Olhofer et al. ........... 416/223 R |
| 2003/0086788 A1 | 5/2003 | Chandraker |
| 2003/0163983 A1 | 9/2003 | Seda et al. |
| 2004/0091353 A1 | 5/2004 | Shahpar et al. |
| 2005/0031454 A1 | 2/2005 | Doloresco et al. |
| 2005/0169761 A1 | 8/2005 | Dube et al. |
| 2005/0254956 A1 | 11/2005 | Dutton et al. |
| 2006/0210395 A1 | 9/2006 | Schuster et al. |
| 2006/0228206 A1* | 10/2006 | Decker et al. ................ 415/1 |
| 2007/0041841 A1 | 2/2007 | Walter et al. |
| 2007/0160478 A1 | 7/2007 | Jarrah et al. |
| 2007/0201983 A1 | 8/2007 | Arinci et al. |
| 2007/0243068 A1 | 10/2007 | Wadia et al. |
| 2008/0098718 A1* | 5/2008 | Henry et al. ................. 60/226.1 |
| 2008/0101959 A1 | 5/2008 | McRae et al. |
| 2008/0120839 A1 | 5/2008 | Schilling |
| 2008/0148564 A1 | 6/2008 | Burton et al. |
| 2008/0226454 A1 | 9/2008 | Decker et al. |
| 2009/0226322 A1 | 9/2009 | Clemen |
| 2009/0274554 A1 | 11/2009 | Guemmer |
| 2009/0304518 A1 | 12/2009 | Kodama et al. |
| 2009/0317227 A1 | 12/2009 | Grover et al. |
| 2010/0054946 A1 | 3/2010 | Orosa et al. |
| 2010/0148396 A1 | 6/2010 | Xie et al. |
| 2010/0232970 A1 | 9/2010 | Murooka et al. |
| 2010/0254797 A1 | 10/2010 | Grover et al. |
| 2010/0260609 A1 | 10/2010 | Wood et al. |
| 2010/0331139 A1 | 12/2010 | McCune |
| 2011/0081252 A1 | 4/2011 | Li |
| 2011/0135482 A1 | 6/2011 | Nash et al. |
| 2011/0206527 A1 | 8/2011 | Harvey et al. |
| 2011/0225979 A1 | 9/2011 | Hoeger et al. |
| 2011/0268578 A1 | 11/2011 | Praisner et al. |
| 2011/0286850 A1 | 11/2011 | Micheli et al. |
| 2012/0057982 A1 | 3/2012 | O'Hearn et al. |
| 2012/0195767 A1 | 8/2012 | Gervais et al. |
| 2012/0237344 A1 | 9/2012 | Wood et al. |
| 2012/0243975 A1 | 9/2012 | Breeze-Stringfellow et al. |
| 2012/0244005 A1 | 9/2012 | Breeze-Stringfellow et al. |
| 2013/0008170 A1 | 1/2013 | Gallagher et al. |
| 2013/0022473 A1 | 1/2013 | Tran |
| 2013/0089415 A1 | 4/2013 | Brown et al. |
| 2013/0149108 A1 | 6/2013 | Webster |
| 2013/0164488 A1 | 6/2013 | Wood et al. |
| 2013/0189117 A1 | 7/2013 | Baltas et al. |
| 2013/0202403 A1 | 8/2013 | Morin et al. |
| 2013/0219922 A1 | 8/2013 | Gilson et al. |
| 2013/0224040 A1 | 8/2013 | Straccia |
| 2013/0266451 A1 | 10/2013 | Pesteil et al. |
| 2013/0340406 A1 | 12/2013 | Gallagher et al. |
| 2014/0030060 A1 | 1/2014 | Magowan |
| 2014/0248155 A1 | 9/2014 | Merville et al. |
| 2015/0354367 A1 | 12/2015 | Gallagher et al. |

FOREIGN PATENT DOCUMENTS

| | | |
|---|---|---|
| EP | 2535527 | 12/2012 |
| EP | 2543818 | 1/2013 |
| GB | 1516041 | 6/1978 |
| GB | 2041090 | 9/1980 |
| WO | 2007038674 | 4/2007 |

OTHER PUBLICATIONS

Analytical Parametric Investigation of Low Pressure Ration Fan, NASA, 1973.*

Turbine Design and Application vol. 2, NASA, 1973.*

Oyama et al., Multiobjective Optimization of a Multi-Stage Compressor Using Evolutionary Algorithm, NASA, 2002, AIAA 2002-3535.*

Willis, Quiet Clean Short-Haul Experimental Engine (QCSEE) Final Report, NASA, Aug. 1979.*

Gas Turbine Engineering Handbook, p. 178, Boyce, 2012.*

Smith, L.,Yeh,H.,(1963).Sweep and Dihedral Effects in Axial-Flow Turbomachinery;Journal of Basic Engineering; Sep. 1963.pp. 401-416.

Engine Specifications. Engine Alliance GP7200—The Engine for the A380. Retrieved Feb. 19, 2015 from http://www.enginealliance.com/engine_specifications.html.

The International Search Report and Written Opinion for PCT Application No. PCT/US2015/016187, mailed May 20, 2015.

The International Search Report and Written Opinion for PCT Application No. PCT/US2015/016011, mailed May 21, 2015.

The International Search Report and Written Opinion for PCT Application No. PCT/US2015/016078, mailed May 29, 2015.

The International Search Report and Written Opinion for PCT Application No. PCT/US2015/016154, mailed May 22, 2015.

The International Search Report and Written Opinion for PCT Application No. PCT/US2015/016086, mailed May 26, 2015.

The International Search Report and Written Opinion for PCT Application No. PCT/US2015/016554, mailed May 26, 2015.

The International Search Report and Written Opinion for PCT Application No. PCT/US2015/015554, mailed May 21, 2015.

The International Search Report and Written Opinion for PCT Application No. PCT/US2014/052325, mailed May 29, 2015.

The International Search Report and Written Opinion for PCT Application No. PCT/US2015/016378, mailed May 29, 2015.

The International Search Report and Written Opinion for PCT Application No. PCT/US2014/052293, mailed May 29, 2015.

The International Search Report and Written Opinion for PCT Application No. PCT/US2014/052516, mailed Jun. 10, 2015.

Aerodynamic Design technique for Optimizing Fan Blade Spacing, Rogalsky et all., Proceedings of the 7th Annual Conference of the Computational Fluid Dynamics Society of Canada, 1999.

Turbine Design and Application. vol. 2. NASA, 1973.

Analytical Parametric Investigation of Low Pressure Ration Fan, NASA, 1973 Metzger et al.

Oyama et al., Multiobjective Optimization of a Multi-Stage Compressor Using Evolutionary Algorithm, NASA, 2002, AIAA 2002-3535 pp. 1-11.

The International Search Report and Written Opinion for PCT Application No. PCT/US2015/016083, mailed Jul. 21, 2015.

(56) References Cited

OTHER PUBLICATIONS

International Search Report and Written Opinion for PCT Application No. PCT/US2015/016018, mailed Nov. 24, 2015.
International Search Report and Written Opinion for PCT Application No. PCT/US2015/016091, mailed Nov. 24, 2015.
International Search Report and Written Opinion for PCT Application No. PCT/US2015/016032, mailed Nov. 24, 2015.
International Search Report and Written Opinion for PCT Application No. PCT/US2015/016135, mailed Nov. 24, 2015.
International Search Report and Written Opinion for PCT Application No. PCT/US2015/016584, mailed Nov. 24, 2015.
International Search Report and Written Opinion for PCT Application No. PCT/US2015/015561, mailed Nov. 24, 2015.
International Search Report and Written Opinion for PCT Application No. PCT/US2015/015575, mailed Nov. 24, 2015.
International Search Report and Written Opinion for PCT Application No. PCT/US2015/015579, mailed Nov. 24, 2015.
International Search Report and Written Opinion for PCT Application No. PCT/US2015/015586, mailed Nov. 24, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan balde containment using teo alternate geometries. 4th European LS-DYNA Users Conference.
Brines, G.L. (1990). The turbofan of tommorrow. Mechanical Engineering: The Journal of the American Society of Mechanical Engineers, 108(8), 65-67.
Faghri, A. (1995). Heat pipe and science technology. Washington D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrook, J.L. (1977). Aircraft engines and gas turbines. Cambridge MA: The MIT Press.
Xie, M. (2008). Intelligent engine systems: Smart case system. NASA/CR-2008-215233.
Knip, Jr., G. (1987). Analysis of an advances technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A., Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product Guide. Retrieved from: http://www.pyrografproducts.com/Merchant5/merchant.mvc?Screen=cp_nanofiber.
Nonocor Technical Data for Epoxy Nanocomposites using Nanomer 1.30E Nanoclay. Nnacor, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.
Lynwander, P. (1983). Gear drive systems: Design and application. New York, New York: Marcel Dekker, Inc.
International Preliminary Report on Patentability for PCT Application No. PCT/US2014/052282, mailed Sep. 1, 2016.
International Preliminary Report on Patentability for PCT Application No. PCT/US2015/016554, mailed Sep. 1, 2016.
International Preliminary Report on Patentability for PCT Application No. PCT/US2014/052434, mailed Sep. 1, 2016.
International Preliminary Report on Patentability for PCT Application No. PCT/US2014/052516, mailed Sep. 1, 2016.
International Preliminary Report on Patentability for PCT Application No. PCT/US2014/052447, mailed Sep. 1, 2016.
International Preliminary Report on Patentability for PCT Application No. PCT/US2015/015579, mailed Sep. 1, 2016.
International Preliminary Report on Patentability for PCT Application No. PCT/US2015/015586, mailed Sep. 1, 2016.
International Preliminary Report on Patentability for PCT Application No. PCT/US2014/052080, mailed Sep. 1, 2016.
International Preliminary Report on Patentability for PCT Application No. PCT/US2015/016135, mailed Sep. 1, 2016.
International Preliminary Report on Patentability for PCT Application No. PCT/US2015/016032, mailed Sep. 1, 2016.
International Preliminary Report on Patentability for PCT Application No. PCT/US2015/015561, mailed Sep. 1, 2016.

* cited by examiner

GAS TURBINE ENGINE AIRFOIL

CROSS-REFERENCE TO RELATED APPLICATIONS

This application claims the benefit of U.S. Provisional Application No. 61/941,671, which was filed on Feb. 19, 2014 and is incorporated herein by reference.

BACKGROUND

This disclosure relates to gas turbine engine airfoils. More particularly the disclosure relates to airfoil gap/chord ratio in, for example, a gas turbine engine compressor or fan section.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes at least low and high pressure compressors, and the turbine section includes at least low and high pressure turbines.

Direct drive gas turbine engines include a fan section that is driven directly by one of the turbine shafts. Rotor blades in the fan section and a low pressure compressor of the compressor section of direct drive engines rotate in the same direction.

Gas turbine engines have been proposed in which a geared architecture is arranged between the fan section and at least some turbines in the turbine section. The geared architecture enables the associated compressor of the compressor section to be driven at much higher rotational speeds, improving overall efficiency of the engine. The propulsive efficiency of a gas turbine engine depends on many different factors, such as the design of the engine and the resulting performance debits on the fan that propels the engine and the compressor section downstream from the fan. Physical interaction between the fan and the air causes downstream turbulence and further losses. Although some basic principles behind such losses are understood, identifying and changing appropriate design factors to reduce such losses for a given engine architecture has proven to be a complex and elusive task.

Similarly, the fan section can also be a significant noise source, as noise is produced by fluid dynamic interaction between the fan blades and the incoming air stream. Some fan blade arrangements have channels that converge at a location downstream of the fan blade leading edges for most or all span positions in an attempt to reduce noise. However, fan blade arrangements that may attempt to mitigate noise may come at the expense of reduced propulsive efficiency.

Prior compressor airfoil geometries may not be suitable for the compressor section of gas turbine engines using a geared architecture, since the significantly different speeds of the compressor changes the desired aerodynamics of the airfoils within the compressor section. Counter-rotating fan and compressor blades, which may be used in geared architecture engines, also present design challenges.

SUMMARY

An airfoil of a turbine engine according to an example of the present disclosure includes pressure and suction sides extending in a radial direction from a 0% span position to a 100% span position. The airfoil has a relationship between a gap/chord ratio and span position that defines a curve with a gap/chord ratio having a portion with a negative slope.

In a further embodiment of any of the foregoing embodiments, the gap/chord ratio that is less than 1.0 at 100% span.

In a further embodiment of any of the foregoing embodiments, the gap/chord ratio of less than 0.9 at 0% span.

In a further embodiment of any of the foregoing embodiments, the gap/chord ratio of less than 0.8 at 0% span.

In a further embodiment of any of the foregoing embodiments, the gap/chord ratio of less than 0.7 at 0% span.

In a further embodiment of any of the foregoing embodiments, the gap/chord ratio of less than 1.04 from 80% span to 100% span.

In a further embodiment of any of the foregoing embodiments, the portion is from 80% span to 100% span.

A gas turbine engine according to an example of the present disclosure includes a combustor section arranged between a compressor section and a turbine section. A fan section has a fan pressure ratio of less than 1.55. An airfoil includes pressure and suction sides extending in a radial direction from a 0% span position to a 100% span position. The airfoil has a relationship between a gap/chord ratio and span position that defines a curve with a gap/chord ratio having a portion with a negative slope.

In a further embodiment of any of the foregoing embodiments, the airfoil is arranged in the compressor section.

In a further embodiment of any of the foregoing embodiments, the compressor section includes at least a low pressure compressor and a high pressure compressor, the high pressure compressor arranged immediately upstream of the combustor section, the airfoil provided in a compressor outside the high pressure compressor section.

In a further embodiment of any of the foregoing embodiments, the fan section includes an array of fan blades, and the low pressure compressor is counter-rotating relative to the array of fan blades.

In a further embodiment of any of the foregoing embodiments, the gas turbine engine is a two-spool configuration.

In a further embodiment of any of the foregoing embodiments, the low pressure compressor is immediately downstream from the fan section.

In a further embodiment of any of the foregoing embodiments, the airfoil is rotatable relative to an engine static structure.

In a further embodiment of any of the foregoing embodiments, the gap/chord ratio that is less than 1.0 at 100% span.

In a further embodiment of any of the foregoing embodiments, the gap/chord ratio of less than 0.9 at 0% span.

In a further embodiment of any of the foregoing embodiments, the gap/chord ratio of less than 0.8 at 0% span.

In a further embodiment of any of the foregoing embodiments, the gap/chord ratio of less than 0.7 at 0% span.

In a further embodiment of any of the foregoing embodiments, the gap/chord ratio of less than 1.04 from 80% span to 100% span.

In a further embodiment of any of the foregoing embodiments, the portion is from 80% span to 100% span.

In a further embodiment of any of the foregoing embodiments, the airfoil is an array of airfoils circumferentially arranged about an axis, facing pressure and suction sides of adjacent airfoils defining a channel in a chordwise direction and having a width between the facing pressure and suction sides at a given span position of the adjacent airfoils. The width at each pressure side location along the channel is defined as a minimum distance to a location along the suction side, the width diverging without converging along the channel for each of the span positions.

In a further embodiment of any of the foregoing embodiments, the airfoil is an array of airfoils circumferentially arranged about an axis, facing pressure and suction sides of adjacent airfoils defining a channel in a chordwise direction and having a width between the facing pressure and suction sides at a given span position of the adjacent airfoils. The width at each pressure side location along the channel is defined as a minimum distance to a location along the suction side, the width diverging without converging along the channel for at least some of the span positions, and the width converging and diverging along the channel for at least some span positions greater than 5% span and less than half of the span positions.

In a further embodiment of any of the foregoing embodiments, the width diverges without converging along the channel at span positions greater than about 20% span In a further embodiment of any of the foregoing embodiments, the width diverges without converging along the channel for greater than or equal to about 80% of the span positions.

In a further embodiment of any of the foregoing embodiments, the width converges along the channel at a location spaced a distance from an inlet of the channel, the distance being greater than a radius defined by a leading edge of the airfoil at the same span position.

In a further embodiment of any of the foregoing embodiments, the array of airfoils is arranged in the fan section.

In a further embodiment of any of the foregoing embodiments, the channel defines a nozzle at span positions where the width converges and diverges along the channel.

In a further embodiment of any of the foregoing embodiments, a minimum width along the nozzle increases as span position increases.

In a further embodiment of any of the foregoing embodiments, the width diverges without converging at span positions from 100% span to less than or equal to about 80% span.

In a further embodiment of any of the foregoing embodiments, the fan section has an array of twenty-six or fewer fan blades, and each of the array of fan blades is a composite fan blade.

These and other features of this disclosure will be better understood upon reading the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
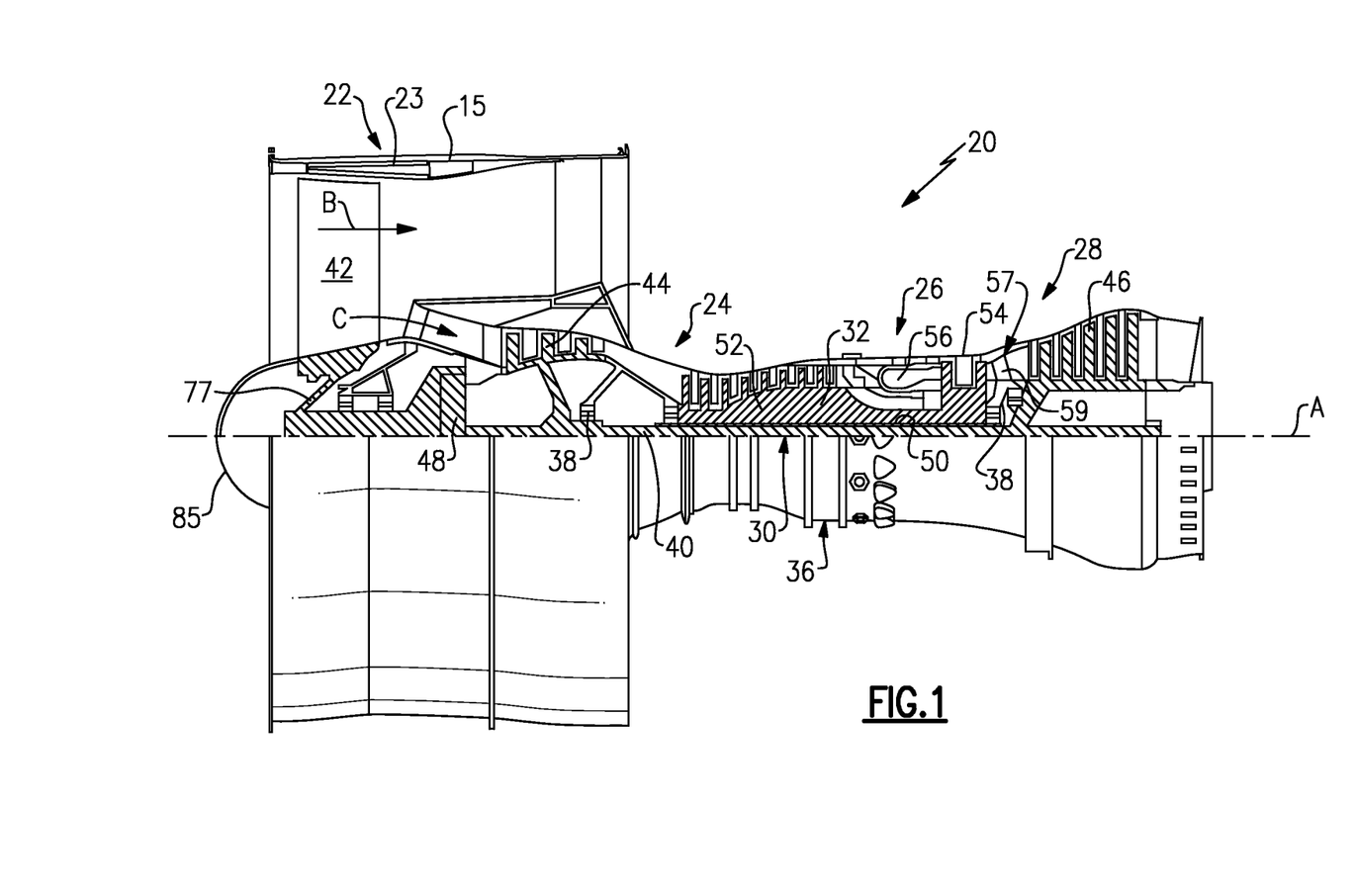
FIG. 1 schematically illustrates a gas turbine engine embodiment with a geared architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(Tram °R)/(518.7°R)]^{0.5}$. The "Low corrected fan tip speed" as disclosed herein according to one non-limiting embodiment is less than about 1200 ft/second (365.7 meters/second).

Figure 2:
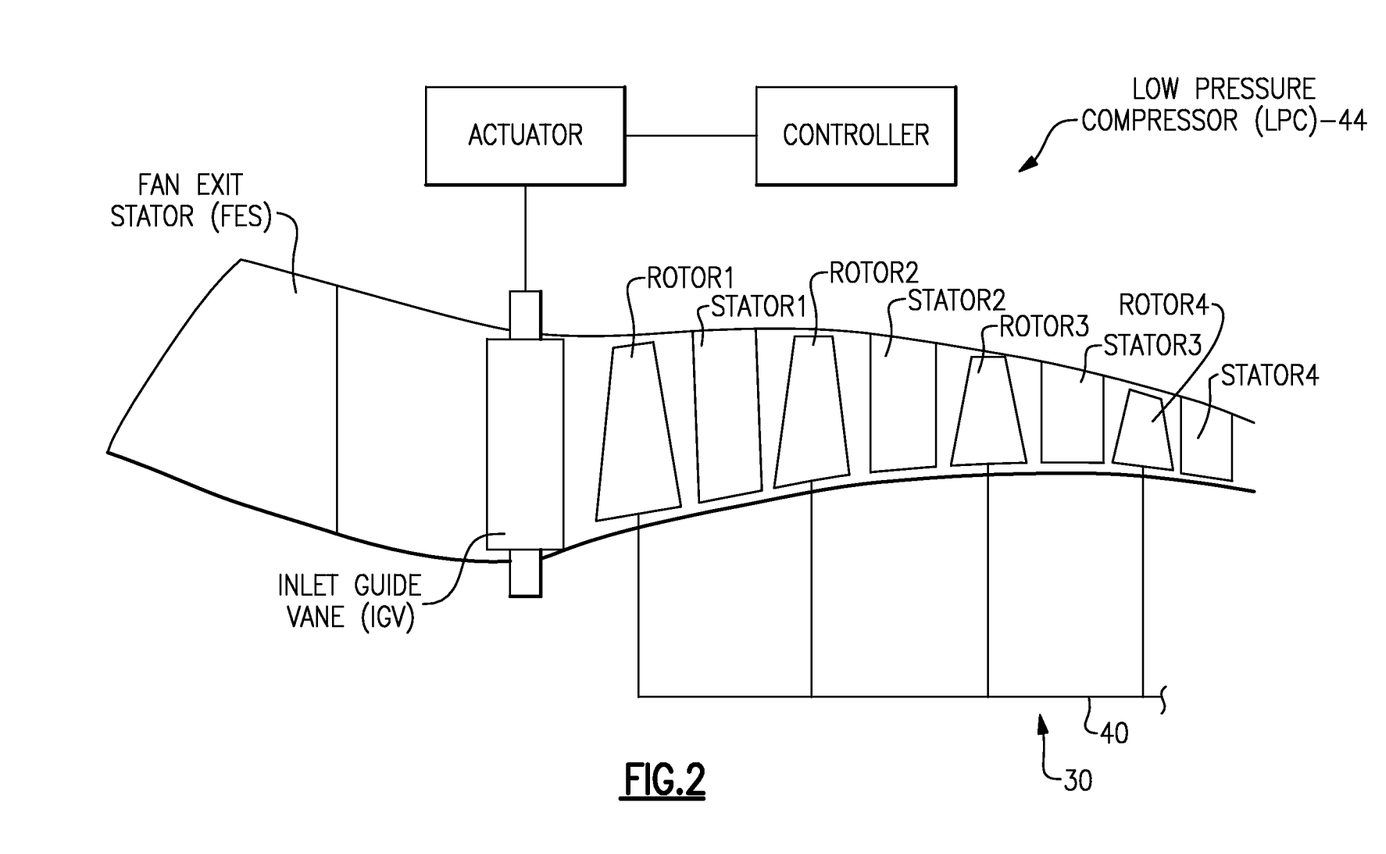
FIG. 2 schematically illustrates a low pressure compressor section of the gas turbine engine of FIG. 1.

Referring to FIG. 2, which schematically illustrates an example low pressure compressor (LPC) 44, a variable inlet guide vane (IGV) is arranged downstream from a fan exit stator (FES). The figure is highly schematic, and the geometry and orientation of various features may be other than shown. An actuator driven by a controller actuates the IGV about their respective axes. Multiple airfoils are arranged downstream from the IGV. The airfoils include alternating stages of rotors (ROTOR1, ROTOR2, ROTOR3, ROTOR4) and stators (STATOR1, STATOR2, STATOR3, STATOR4). In the example shown in FIG. 2, the LPC includes four rotors alternating with four stators. However, in another example, a different number of rotors and a different number of stators may be used. Moreover, the IGV and stator stages may all be variable, fixed or a combination thereof.

The disclosed airfoils may be used in a low pressure compressor of a two spool engine or in portions of other compressor configurations, such as low, intermediate and/or high pressure areas of a three spool engine. However, it should be understood that any of the disclosed airfoils may be used for blades or vanes, and in any of the compressor section, turbine section and fan section.

In some examples, the fan section 22 includes a hardwall containment system 23 arranged about the engine axis A and spaced radially from the fan blades 42. The hardwall containment system 23 is configured to contain, and absorb the impact of, a fan blade 42 separating from a fan hub 77 or a fragment thereof. In some embodiments, the hardwall containment system 23 is a hard ballistic liner applied to the nacelle or fan case 15. The hard ballistic liner can include a rigid material such as a resin impregnated fiber structure, metallic structures, or ceramic structures.

Various materials and structures of the fan case 15 and/or hardwall containment system 23 can be utilized. In some examples, the fan section 22 includes a composite fan case 15 made of an organic matrix composite. The organic matrix composite can include a matrix material and reinforcement fibers distributed through the matrix material. The reinforcement fibers may be discontinuous or continuous, depending upon the desired properties of the organic matrix composite, for example. The matrix material may be a thermoset polymer or a thermoplastic polymer. The reinforcement fibers may include carbon graphite, silica glass, silicon carbide, or ceramic. Given this description, one of ordinary skill in the art will recognize that other types of matrix materials and reinforcement fibers may be used. The disclosed arrangements of the composite fan case 15 reduce the overall weight of the nacelle assembly, thereby improving propulsive efficiency and overall performance.

Figure 3:
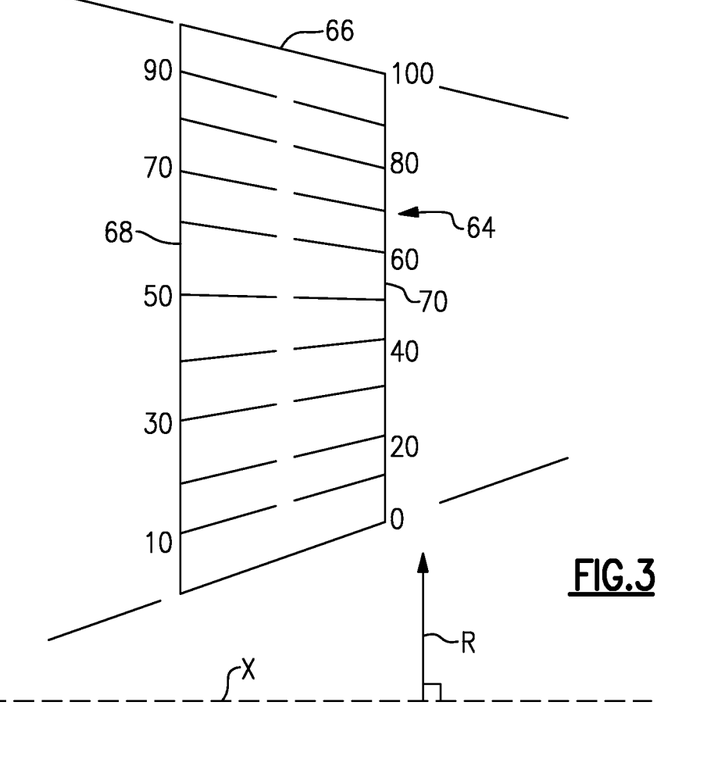
FIG. 3 is a schematic view of airfoil span positions.

Referring to FIG. 3, span positions on an airfoil 64 are schematically illustrated from 0% to 100% in 10% increments. The airfoil 64 can be located in the fan section 22 or the compressor section 24, for example. Each section at a given span position is provided by a conical cut that corresponds to the shape of the core flow path, as shown by the large dashed lines. In the case of an airfoil with an integral platform, the 0% span position corresponds to the radially innermost location where the airfoil meets the fillet joining the airfoil to the inner platform. In the case of an airfoil without an integral platform, the 0% span position corresponds to the radially innermost location where the discrete platform meets the exterior surface of the airfoil. For airfoils having no outer platform, such as blades, the 100% span position corresponds to the tip 66. For airfoils having no platform at the inner diameter, such as cantilevered stators, the 0% span position corresponds to the inner diameter location of the airfoil. For stators, the 100% span position corresponds to the outermost location where the airfoil meets the fillet joining the airfoil to the outer platform.

Figure 4A:
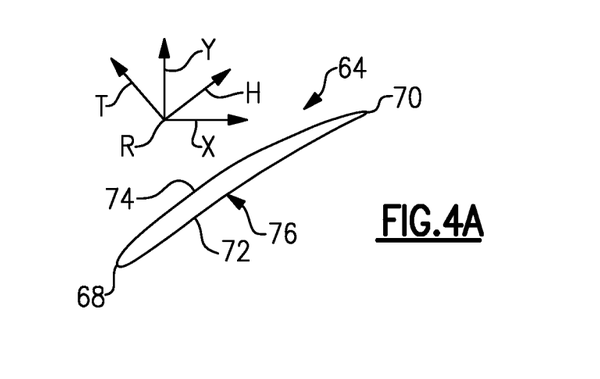
FIG. 4A is a schematic view of a cross-section of an airfoil sectioned at a particular span position and depicting directional indicators.

Airfoils in each stage of the fan section or LPC are specifically designed radially from an inner airfoil location (0% span) to an outer airfoil location (100% span) and along circumferentially opposite pressure and suction sides 72, 74 extending in chord between a leading and trailing edges 68, 70 (see FIG. 4A). Each airfoil is specifically twisted with a corresponding stagger angle and bent with specific sweep and/or dihedral angles along the airfoil. Airfoil geometric shapes, stacking offsets, chord profiles, stagger angles, sweep and dihedral angles, among other associated features, are incorporated individually or collectively to improve characteristics such as aerodynamic efficiency, structural integrity, and vibration mitigation, for example, in a gas turbine engine with a geared architecture in view of the higher LPC rotational speeds or lower fan rotational speeds.

The airfoil 64 has an exterior surface 76 providing a contour that extends from a leading edge 68 generally aftward in a chord-wise direction H to a trailing edge 70, as shown in FIG. 4. Pressure and suction sides 72, 74 join one another at the leading and trailing edges 68, 70 and are spaced apart from one another in an airfoil thickness direction T. An array of airfoils 64 are positioned about the axis X (corresponding to an X direction) in a circumferential or tangential direction Y. Any suitable number of airfoils may be used for a particular stage in a given engine application.

The exterior surface 76 of the airfoil 64 generates lift based upon its geometry and directs flow along the core flow path C. The airfoil 64 may be constructed from a composite material, or an aluminum alloy or titanium alloy, or a combination of one or more of these. Abrasion-resistant coatings or other protective coatings may be applied to the airfoil. The rotor stages may constructed as an integrally bladed rotor, if desired, or discrete blades having roots secured within corresponding rotor slots of a disc. The stators may be provided by individual vanes, clusters of vanes, or a full ring of vanes.

Figure 4B:
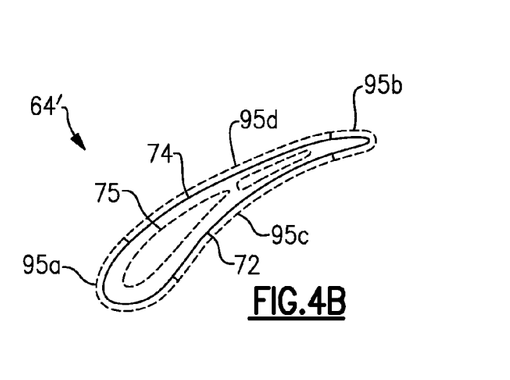
FIG. 4B is a cross-sectional view of a sheath arrangement for an airfoil.

FIG. 4B illustrates a schematic cross-sectional view of a composite airfoil 64' which can be utilized in the fan section 22, for example. In some examples, the airfoil 64' is made of a two dimensional or three-dimensional composite. The composite may be formed from a plurality of braided yarns such as carbon fibers. Other materials can be utilized, such as fiberglass, Kevlar®, a ceramic such as Nextel™, and a polyethylene such as Spectra®. In other examples, the composite is formed from a plurality of uni-tape plies or a fabric. The fabric can include woven or interlaced fibers, for example.

In some examples, the airfoil 64' is three-dimensional composite free of a central core. In other examples, the airfoil 64' includes one or more cores 75. The core 75 can include a foam or other lightweight material such as polyurethane. Other materials can be utilized, such as metallic foam and polymethacrylimide (PMI) foam sold under the trade name Rohacell®. In other examples, the core 75 is formed from one or more plies of fabric or from braided yarns.

Each airfoil 64' can include a sheath 95. In some examples, a sheath 95a is located at a leading edge 68 of the airfoil 64'. In other examples, a sheath 95b is located at a trailing edge 70 of the airfoil 64'. Other locations of the sheath 95 are contemplated, such as on pressure and/or suction sides 72, 74 of the airfoil 64'. In another example, a sheath 95 extends across at least a portion of the airfoil tip 66 between the leading edge 68 and trailing edge 70 of the airfoil 64'. Various materials of the sheath 95 can be utilized, such as titanium, a steel alloy or another material.

Airfoil geometries can be described with respect to various parameters provided. The disclosed graph(s) illustrate the relationships between the referenced parameters within 10% of the desired values, which correspond to a hot aerodynamic design point for the airfoil. In another example, the referenced parameters are within 5% of the desired values, and in another example, the reference parameters are within 2% of the desired values. It should be understood that the airfoils may be oriented differently than depicted, depending on the rotational direction of the blades. The signs (positive or negative) used, if any, in the graphs of this disclosure are controlling and the drawings should then be understood as a schematic representation of one example airfoil if inconsistent with the graphs. The signs in this disclosure, including any graphs, comply with the "right hand rule."

Figure 5:
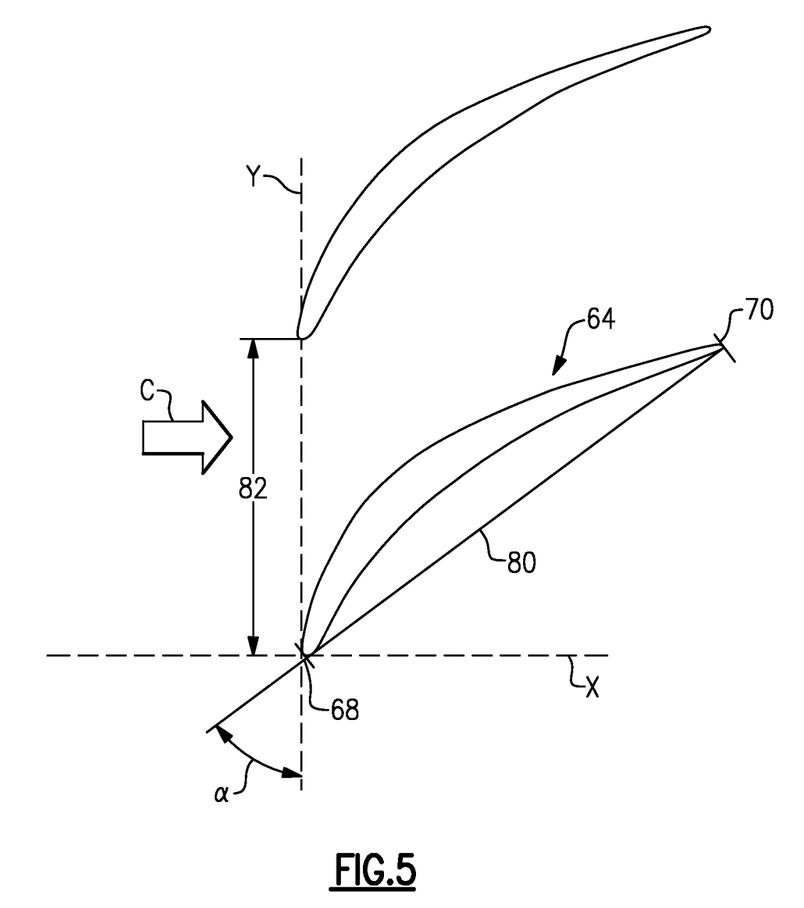
FIG. 5 is a schematic view of adjacent airfoils depicting a gap and a chord of the airfoil.

FIG. 5 shows an isolated view of a pair of adjacent airfoils 64. As shown, the airfoil 64 is sectioned at a radial position between the root and the tip. A chord 80 is shown on the section of the airfoil 64. The chord 80, which is the length between the leading and trailing edges 68, 70, forms an angle, or stagger angle α, with a tangential plane (in the Y-direction) normal to the engine's central longitudinal axis in the X-direction. A dimension of the chord 80 may vary along the span of the airfoil 64. The leading edges 68 of the adjacent airfoils 64 are separated by a gap 82 or circumferential pitch in the Y-direction. The gap 82 is equivalent to the arc distance between the leading edges 68 of neighboring airfoils 64 for a corresponding span position. A ratio of gap/chord, the inverse of which is referred to as solidity, varies with position along the span, and varies between a hot, running condition and a cold, static ("on the bench") condition.

Figure 6A:
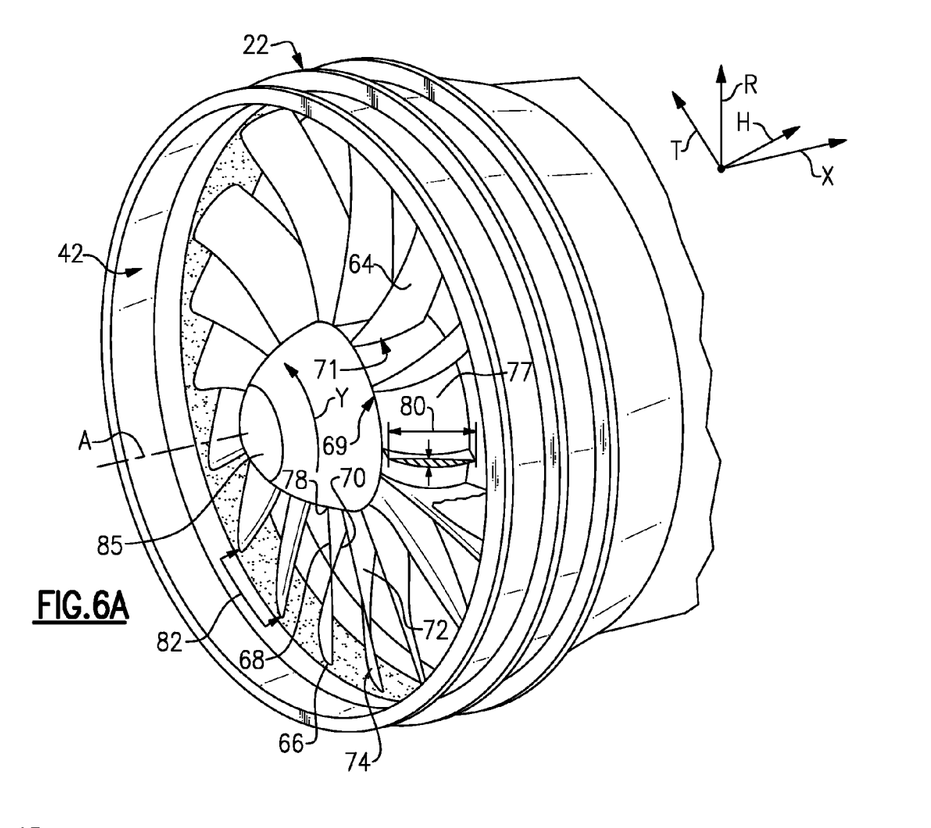
FIG. 6A is a perspective view of a fan section.
Figure 6B:
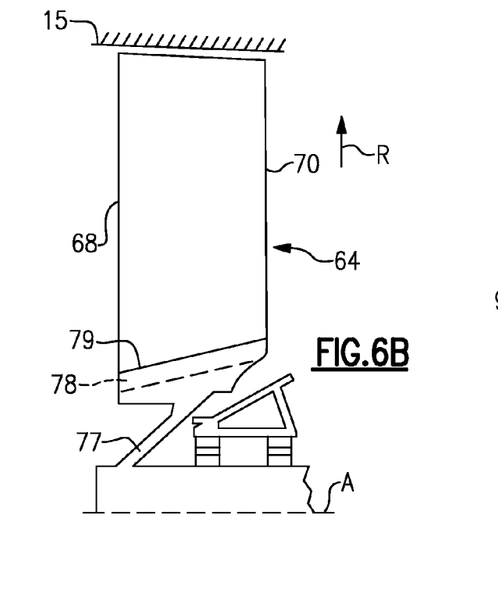
FIG. 6B is a schematic cross-sectional view of the fan section of FIG. 6A.

FIGS. 6A-6B shows an example in which the airfoils 64 are a plurality of fan blades in the fan section 22. The fan 42 includes a rotor 69 having an array or row 71 of fan blades or airfoils 64 that extend circumferentially around and are supported by the fan hub 77. Any suitable number of airfoils 64 may be used in a given application. The hub 77 is rotatable about the engine axis A. The array 71 of airfoils 64 are positioned about the axis A in a circumferential or tangential direction Y. Each of the airfoils 64 includes an airfoil body that extends in a radial span direction R from the hub 77. A root 78 of the airfoil 64 is received in a correspondingly shaped slot in the hub 77. The airfoil 64 extends radially outward of a platform 79, which provides the inner flow path. The platform 79 may be integral with the airfoil 64 or separately secured to the hub 77, for example. A spinner 85 is supported relative to the hub 77 to provide an aerodynamic inner flow path into the fan section 22.

The geared architecture 48 of the disclosed example permits the fan 42 to be driven by the low pressure turbine 46 through the low speed spool 30 at a lower angular speed than the low pressure turbine 46, which enables the LPC 44 to rotate at higher, more useful speeds. The gap/chord ratio in a hot, running condition along the span of the airfoils 64 provides necessary fan or compressor operation in cruise at higher speeds enabled by the geared architecture 48, to enhance aerodynamic functionality and thermal efficiency. As used herein, the hot, running condition is the condition during cruise of the gas turbine engine 20. For example, the gap/chord ratio in the hot, running condition can be determined in a known manner using finite element analysis.

Figure 7:
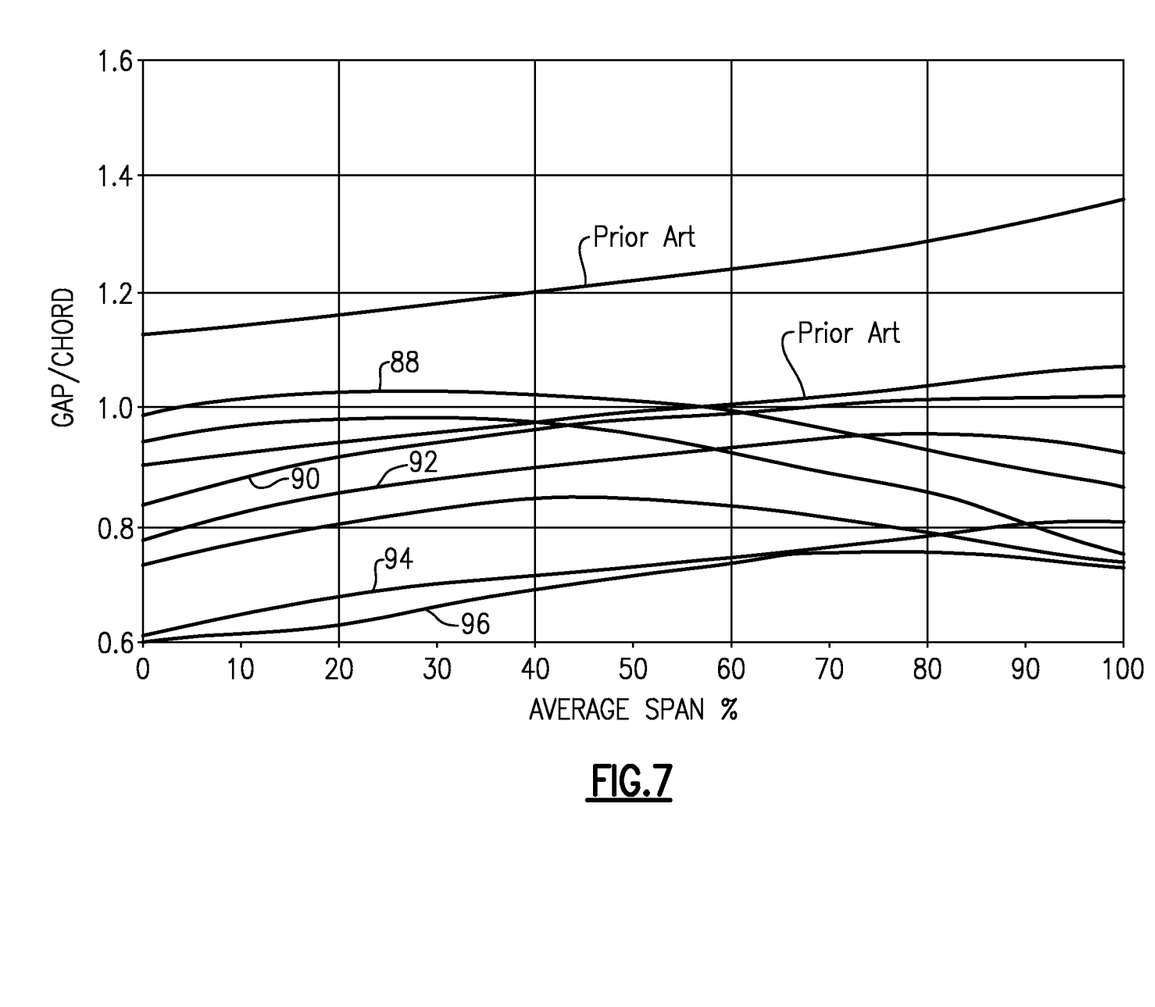
FIG. 7 graphically depicts curves for several example airfoil gap/chord ratios relative to span, including two prior art curves and several inventive curves according to this disclosure.

FIG. 7 illustrates the relationship between the gap/chord ratio and the average span (AVERAGE SPAN %), which is the average of the radial position at the leading and trailing edges 68, 70. In one example, the airfoils are LPC rotor blades. In alternative examples, the airfoils are fan blades. Two prior art curves ("PRIOR ART") are illustrated as well as several example inventive curves 88, 90, 92, 94, 96. The airfoil 64 has a relationship between a gap/chord ratio and span position. The curve has a gap/chord ratio with a portion having a negative slope, unlike the prior art entirely positive slopes. In one example, the portion is from 80% span to 100% span. The gap/chord ratio of less than 1.04 from 80% span to 100% span, which is significantly less than the prior art. In one example, the gap/chord ratio that is less than 1.0 at 100% span.

The initial gap/chord ratio is also less than in prior art airfoils. In one example, the gap/chord ratio of less than 0.9 at 0% span, and in another example, the gap/chord ratio of less than 0.8 at 0% span. In another example, the gap/chord ratio of less than 0.7 at 0% span.

In examples, in which the airfoil is located in the compressor section, the gap/chord ratio of the inventive curves is less than prior art airfoils due to the higher speed of the LPC, which maintains the efficiency of the airfoils. A larger gap/chord ratio than the inventive curves, such as those similar to prior art airfoils, would permit the core flow to pass through the blades without sufficiently compressing the fluid, thereby reducing compressor effectiveness.

Figure 8A:
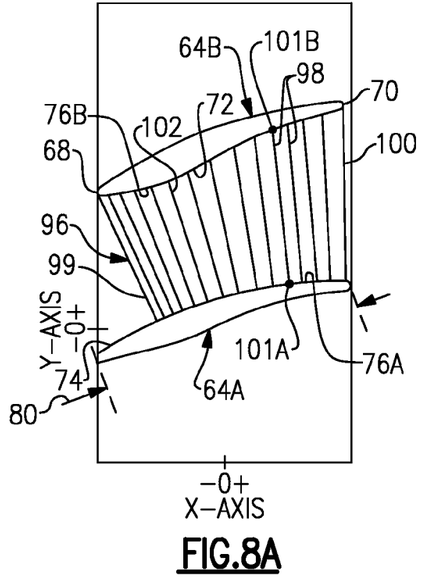
FIG. 8A is a schematic view of the adjacent airfoils depicting point pairs along a channel between the adjacent airfoils at a first span position.

FIGS. 8A-8E illustrate example channel arrangements for an array of airfoils. Referring to FIG. 8A, a leading airfoil 64A and a following airfoil 64B are spaced apart in the circumferential direction Y to define a channel 96 extending generally in a chordwise direction from a leading edge 68 of airfoil 64B. Pressure side 72 of airfoil 64B and suction side 74 side of airfoil 64A define a plurality of segments or channel widths 98 along the channel 96. For the purposes of this disclosure, each channel width 98 along the channel 96 is a straight-line connected point pair extending from a point 101B on the pressure side 72 of the airfoil 64B to a point 101A on the suction side 74 of the airfoil 64A that is a minimum distance from the point on the pressure side 72. In this manner, a connected point pair can be defined at each location along the channel 96. The channel widths 98 vary generally in the axial direction X due to contouring of exterior surfaces 76. The channel widths 98 may vary along the span of the airfoil 64.

The channel 96 is provided with an inlet 99 at the leading edge 68 of airfoil 64B and an outlet 100 downstream of the inlet 99. In some examples, the width of the channel 96 diverges without converging in a chordwise direction along the channel 96 for at least some of the span positions. In further examples, the width of the channel 96 diverges without converging in a chordwise direction along the channel 96 for each of the span positions. This arrangement is shown in FIG. 8E at a given span position. Rather, a minimum width of the channel 96 from the inlet 99 to the outlet 100 of the channel 96 increases from 0% span to 100% span.

In other examples, at some span positions the channel width 98 converges along the channel 96 to define a nozzle 102, where 102 is labeled at a throat of the nozzle, configured to meter flow of the incoming air through the channel 96. The nozzle 102 defines a minimum channel width 98 along the channel 96. The nozzle 102 is located downstream of a position along the pressure side 72 of airfoil 64B at a radius defined by the leading edge 68. Rather, the inlet 99 is characterized in part by the geometry of the leading edge 68 (best seen in FIG. 8D), whereas the nozzle 102 is characterized by the contouring of the pressure side 72 downstream of the inlet 99 (best seen in FIG. 8A). In some examples, the channel width 98 converges and diverges along the nozzle 102, commonly referred to as a "venturi" or "converging-diverging" configuration, for at least some span positions (shown in FIG. 8A). In further examples, the channel width 98 at the nozzle 102 increases as span position increases. In other examples, the channel 96 has substantially the same minimum channel width 98 from the nozzle 102 to the outlet 100, commonly referred to as a "converging-straight" configuration.

Various arrangements for the nozzle 102 can be utilized in accordance with the teachings herein. In one example, the nozzle 102 extends radially from about a 0% span position. In another example, the nozzle 102 is spaced radially from the 0% span position. In some examples, the channel width 98 converges and diverges along the channel 96 at span positions greater than 5% span, greater than 10% span, or greater than about 20% span. In another example, the nozzle 102 extends, less than or equal to about 50% of the span positions. In yet another example, the nozzle 102 extends less than or equal to about 20% of the span positions, and in further examples, the nozzle 102 extends radially outward less than or equal to about 20% span. In some examples, the channel width 98 diverges without converging for greater than or equal to about 80% of the span positions. In some examples, the channel width 98 diverges without converging at the tip 66 or 100% span such that a nozzle is not formed at the tip 66. In further examples, the channel width 98 diverges without converging from 100% span to about 80% span, or from 100% span to about 50% span.

Figure 8B:
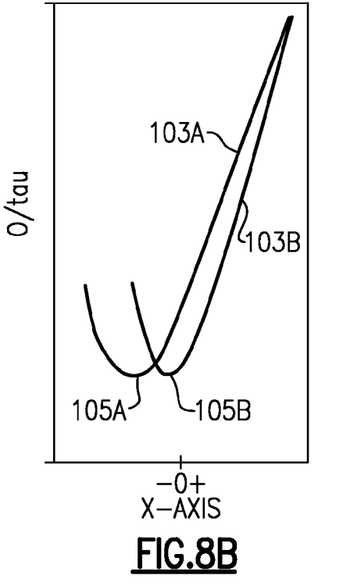
FIG. 8B graphically depicts curves for example airfoil chord length to point pair ratios relative to engine position between the adjacent airfoils of FIG. 8A.
Figure 8C:
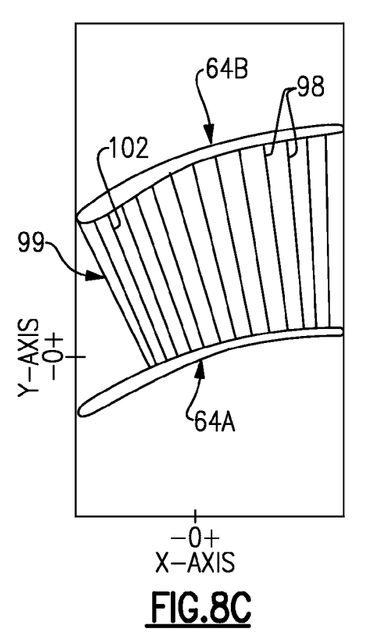
FIG. 8C is a schematic view of the adjacent airfoils depicting point pairs along a channel between the adjacent airfoils at a second span position.
Figure 8D:
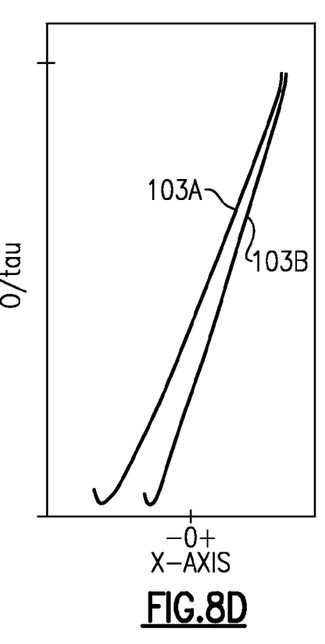
FIG. 8D graphically depicts curves for example airfoil chord length to point pair ratios relative to engine position between the adjacent airfoils of FIG. 8C.
Figure 8E:
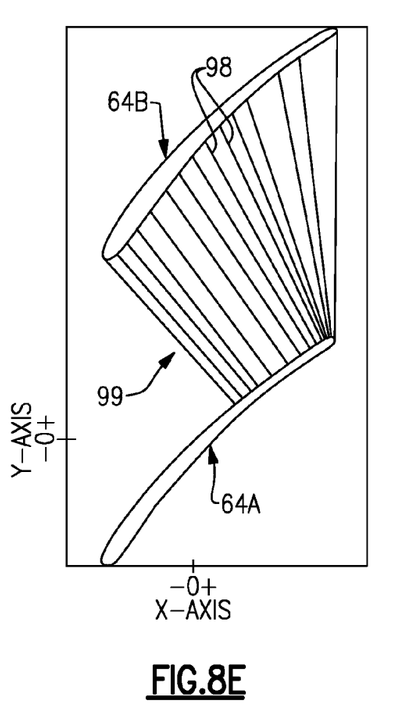
FIG. 8E is a schematic view of the adjacent airfoils depicting point pairs along a channel between the adjacent airfoils at a third span position.
Figure 8F:
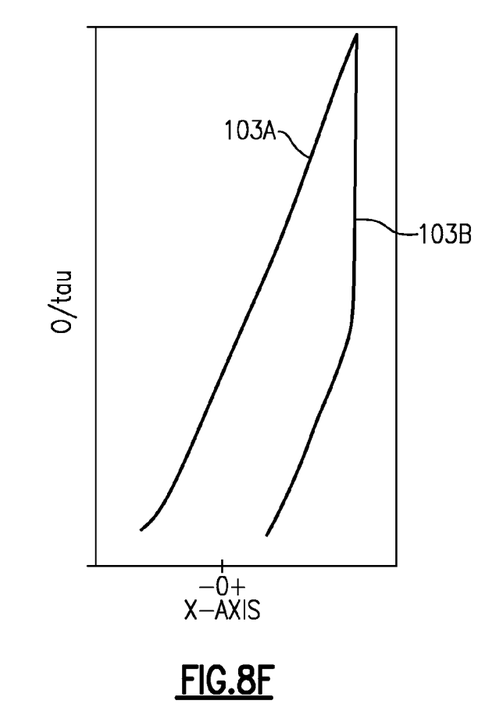
FIG. 8F graphically depicts curves for example airfoil chord length to point pair ratios relative to engine position between the adjacent airfoils of FIG. 8E.

FIG. 8B illustrates example plots 103A, 103B for a ratio between channel widths (O) and a dimension (tau) of the gap 82 or circumferential pitch corresponding to airfoils 64A, 64B of FIG. 8A at 0% span position. The channel widths (O) correspond to positions along the along the channel 96, including locations 98, 99, 100 and 102. As shown, the ratio (O/tau) decreases from the inlet 99 to nozzle 102 with respect to the engine axis A (x-axis) and thereafter increases downstream of the nozzle 102 to the outlet 100 to define inflections 105A, 105B. Rather, the ratio (O/tau) at the nozzle 102 is the minimum value for the channel widths 98 along the channel 96. The nozzle 102 is defined for less than half of the span of the channel 96 such that the channel width 98 increases or is divergent from the inlet 99 to the outlet 100 for other portions of the span such that the ratio (O/tau) generally increases from the inlet 99 to the outlet 100 of the channel 96, as illustrated by FIGS. 8C-8D at about 20% span, for example. Other portions of the channel 96 are divergent or increase from the inlet 99 to the outlet 100 of the channel, as illustrated by FIGS. 8E-8F at about 100% span, according to an example.

Engines made with the disclosed architecture, and including the compressor and fan section arrangements as set forth in this application, and with modifications coming from the scope of the claims in this application, thus provide very high efficient operation, have reduced noise emissions, and are compact and lightweight relative to their thrust capability. Two-spool and three-spool direct drive engine architectures can also benefit from the teachings herein.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil arrangement of a turbine engine comprising:
adjacent airfoils including pressure and suction sides extending in a radial direction from a 0% span position to a 100% span position, wherein the airfoils have a relationship between a gap/chord ratio and span position that defines a curve with a gap/chord ratio having a portion with a negative slope, the adjacent airfoils are rotating blades, the gap/chord ratio is less than 1.0 at 100% span, and the gap/chord ratio is less than 1.0 at each span position.

2. The airfoil arrangement according to claim 1, wherein the gap/chord ratio is less than 0.9 at 0% span.

3. The airfoil arrangement according to claim 2, wherein the gap/chord ratio is less than 0.8 at 0% span.

4. The airfoil arrangement according to claim 3, wherein the gap/chord ratio is less than 0.7 at 0% span.

5. The airfoil arrangement according to claim 1, wherein the portion is from 80% span to 100% span.

6. A gas turbine engine comprising:
a combustor section arranged between a compressor section and a turbine section;
a fan section having a fan pressure ratio of less than 1.55; and
adjacent airfoils including pressure and suction sides extending in a radial direction from a 0% span position to a 100% span position, wherein the airfoils have a relationship between a gap/chord ratio and span position that defines a curve with a gap/chord ratio having a portion with a negative slope, the adjacent airfoils are rotating blades, the gap/chord ratio is less than 1.0 at 100% span, the fan section has an array of twenty-six or fewer fan blades, and the gap/chord ratio is less than 1.0 at each span position.

7. The gas turbine engine according to claim 6, wherein the airfoils are arranged in the compressor section.

8. The gas turbine engine according to claim 7, wherein the compressor section includes at least a low pressure compressor and a high pressure compressor, the high pressure compressor arranged immediately upstream of the combustor section, the airfoils provided in a compressor outside the high pressure compressor section.

9. The gas turbine engine according to claim 8, wherein the low pressure compressor is counter-rotating relative to the array of fan blades.

10. The gas turbine engine according to claim 8, wherein the gas turbine engine is a two-spool configuration.

11. The gas turbine engine according to claim 8, wherein the low pressure compressor is immediately downstream from the fan section.

12. The gas turbine engine according to claim 8, wherein the airfoils are rotatable relative to an engine static structure.

13. The gas turbine engine according to claim 6, wherein the gap/chord ratio is less than 0.9 at 0% span.

14. The gas turbine engine according to claim 13, wherein the gap/chord ratio is less than 0.8 at 0% span.

15. The gas turbine engine according to claim 14, wherein the gap/chord ratio is less than 0.7 at 0% span.

16. The gas turbine engine according to claim 6, wherein the portion is from 80% span to 100% span.

17. The gas turbine engine according to claim 6, wherein the gap/chord ratio is greater than 0.6 at each span position.

18. The gas turbine engine according to claim 6, wherein the adjacent airfoils are fan blades arranged in the fan section.

19. The gas turbine engine according to claim 18, wherein the curve has another portion with a positive slope.

20. A gas turbine engine comprising:
a fan section including a fan;
a gear arrangement configured to drive the fan section;
a compressor section;
a turbine section configured to drive the compressor section and the gear arrangement; and
adjacent airfoils including pressure and suction sides extending in a radial direction from a 0% span position to a 100% span position, wherein the adjacent airfoils have a relationship between a gap/chord ratio and span position that defines a curve with a gap/chord ratio having a portion with a negative slope from 80% span to 100% span and another portion with a positive slope, and the gap/chord ratio is less than 1.0 at each span position.

21. The gas turbine engine according to claim 20, wherein the adjacent airfoils are blades arranged in the compressor section.

22. The airfoil according to claim 21, wherein the gap/chord ratio is greater than 0.6 at each span position.

23. The gas turbine engine according to claim 20, wherein the adjacent airfoils are fan blades arranged in the fan section.

* * * * *